June 20, 1972  W. M. FRASER ET AL  3,671,149
COOLING-GAS CIRCULATORS FOR NUCLEAR-POWER STATIONS
Filed Oct. 9, 1968  4 Sheets-Sheet 1

Inventors
WILLIAM MILTON FRASER,
WALTER JOHN CAIRNS & IAN NORMAN MacDONALD
By
Mason, Fenwick & Lawrence
Attorneys

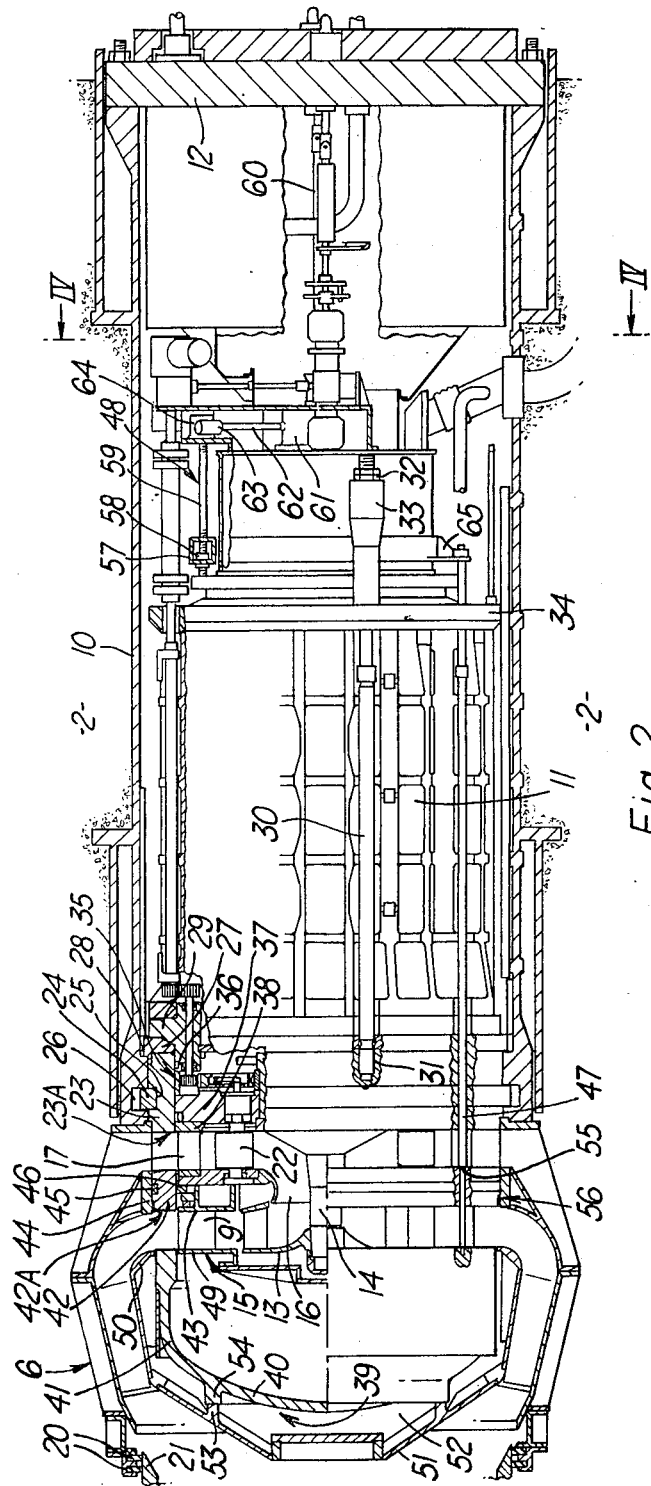

Inventors
WILLIAM MILTON FRASER,
WALTER JOHN CAIRNS & IAN NORMAN MacDONALD

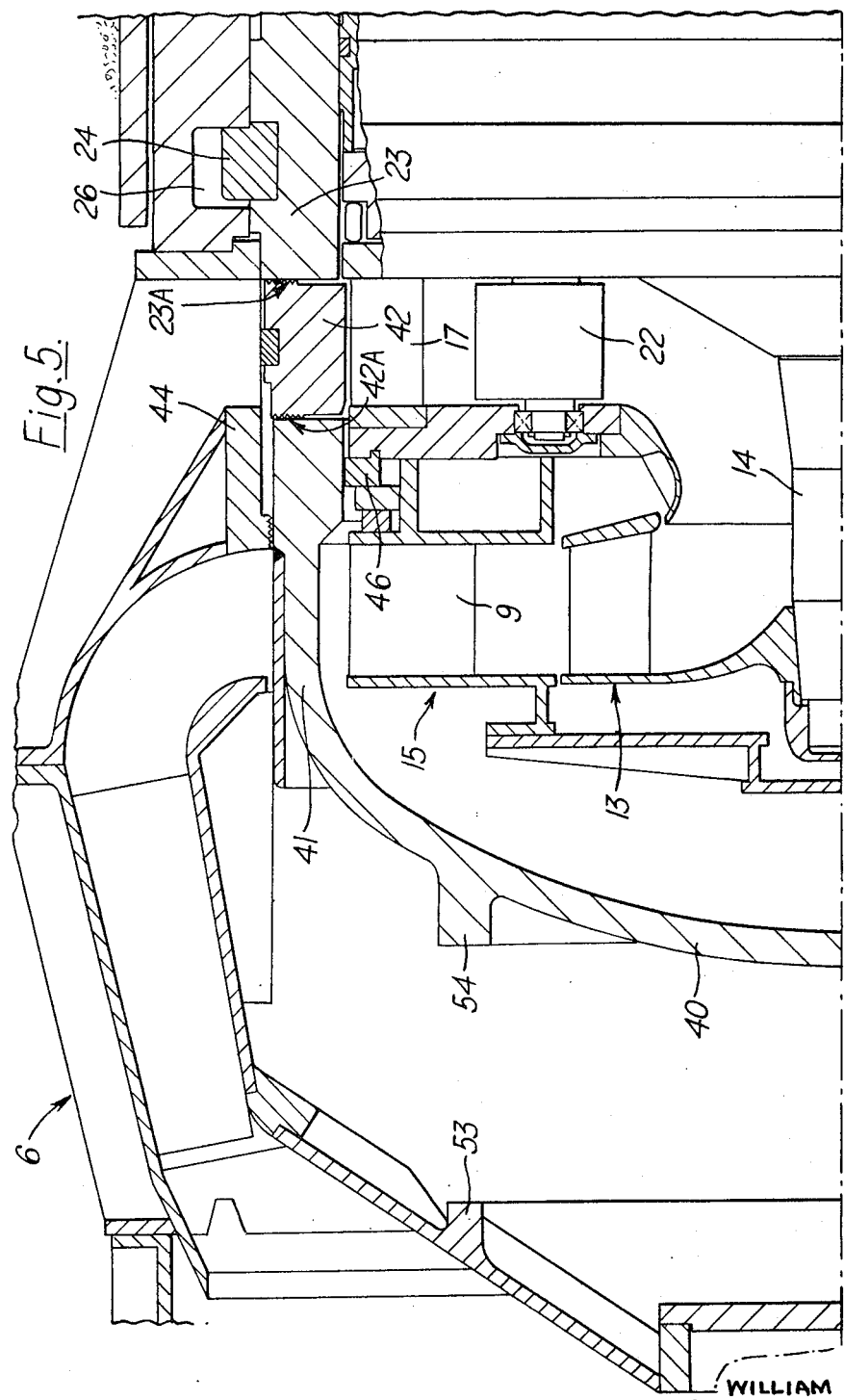

United States Patent Office 3,671,149
Patented June 20, 1972

3,671,149
COOLING-GAS CIRCULATORS FOR NUCLEAR-POWER STATIONS
William Milton Fraser, Busby, Glasgow, Walter John Cairns, Bearsden, Glasgow, and Ian Norman McDonald, Largs, Scotland, assignors to James Howden & Company Limited, Glasgow, Scotland
Filed Oct. 9, 1968, Ser. No. 766,211
Int. Cl. F04d 25/06
U.S. Cl. 417—360     7 Claims

ABSTRACT OF THE DISCLOSURE

A circulator for the pressurized gas in the cooling circuit of a nuclear reactor power station is of a kind having an electric motor withdrawably mounted in a wall-mounted pressure vessel, and a motor-driven gas blower in the gas space at the inner end of the vessel. Provision is made for isolating the inner end of the vessel from the reactor to enable withdrawal of the blower with the motor, the isolating means including an axially reciprocable ring closing an annular gap between the blower casing and ducting in the gas space, and an axially reciprocable dome in the gas space; the ring engaging the vessel and the dome engaging the ring to effect sealing of the vessel from the reactor.

---

This invention relates to the circulation of cooling gas in the pressure vessel of a nuclear-reactor plant, and is concerned more particularly with a gas circulator of the kind comprising a tubular housing in an opening in the wall of the pressure vessel, a motor in the housing, a blower in the pressure vessel drivingly connected to the motor and presenting radially outwardly directed inlet and discharge openings, and a duct in the pressure vessel presenting a radially inwardly directed inlet opening opposed to the blower discharge opening to receive the gas flow from the blower.

Usually the plant has a plurality of circulators and in each provision is made for sealing off the housing from the gas space of the pressure vessel, depressurizing the sealed housing, and withdrawing the motor from the depressurized housing for maintenance and repair, while the plant continues to operate with the remaining circulators. However, heretofore no provision has been made for withdrawing the blower from the gas space for maintenance and repair while permitting continued operation of the plant. It is the chief object of the present invention to rectify this omission.

According to the present invention we provide a gas circulator of the aforesaid kind including an isolator for the housing comprising an annular seat at the inner end of the housing, a ring spaced axially inwards from the seat to form therewith an annular through passage surrounding the blower, and an end cover spaced axially inwards from the ring to form therewith an annular through passage surrounding the blower, the annular through passages permitting flow of gas through the blower and into the duct and the ring being axially movable on to the seat and the end cover being axially movable on to the ring so that the ring and end cover together enclose the blower and close the inner end of the housing.

An embodiment of the invention will now be described by way of example with reference to the accompanying drawings in which:

FIG. 2 is a part-sectional side view of the circulator;

FIG. 5 is a sectional side view of part of the isolating means in operative position.

Figure 1:
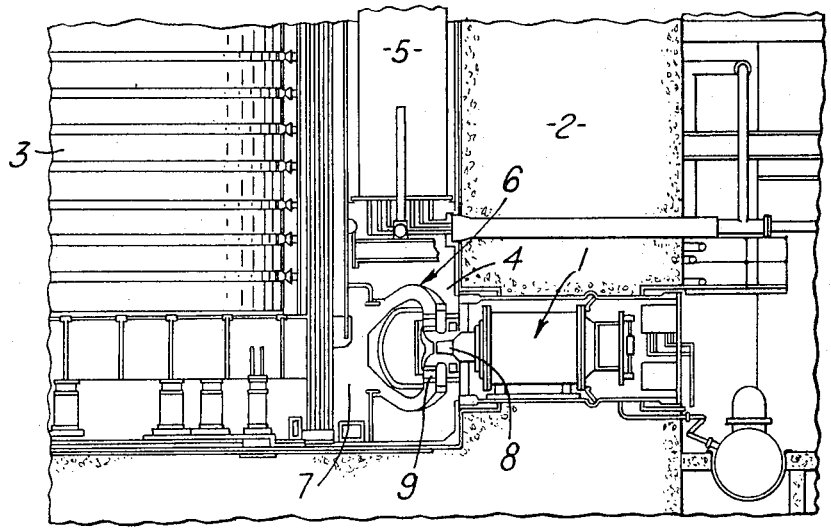
FIG. 1 is a fragmentary sectional elevation of a gas-cooled nuclear-reactor power station showing the disposition of the cooling-gas circulator therein.
Figure 3:
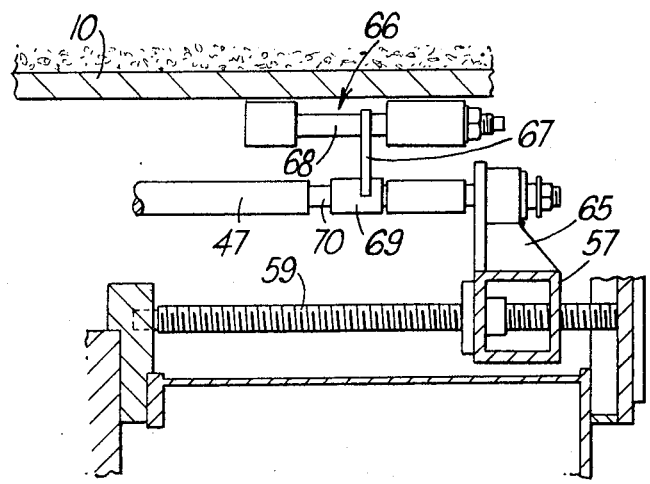
FIG. 3 is a view of a detail of isolating means for the inner end of the circulator.
Figure 4:
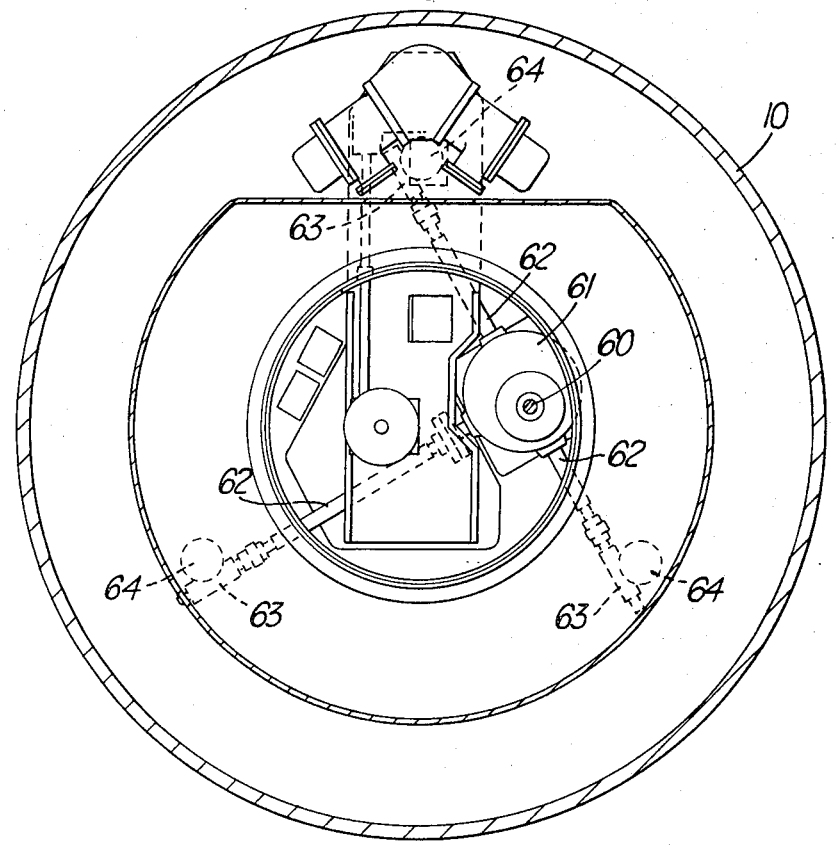
FIG. 4 is a cross-sectional view on the line IV—IV of FIG. 2.

Referring to the drawings:

In FIG. 1 a number of horizontal, submerged main circulators 1 for pressurized gas are mounted as a peripheral series in the thick concrete wall 2 of a circular concrete building which houses the reactor core 3 and encloses a gas space 4. Each gas circulator 1 withdraws gas from a heat exchanger 5 through the gas space 4, and includes annular ducting 6 which is located in the gas space 4 and discharges into an annular plenum chamber 7 delivering to the reactor core 3. Each gas circulator 1 is mounted horizontally in the concrete wall 2, with a blower 8 of the circulator located in the gas space 4, and the blower's outlet passage 9 connected to the ducting 6 so that on operation of the circulators pressurized cooling gas circulates through the heat exchanger 5 and the nuclear core 3.

In FIG. 2, each circulator 1 includes a horizontal cylindrical tube 10 embedded transversely in the concrete of the wall 2 in the manner described in co-pending patent application No. 766,199 and terminating at or near the wall faces; an electric motor 11 mounted end-for-end in the tube 10; a removable front end closure 12 sealing the outer end of the tube; and the blower 8 including an impeller 13 coupled to the motor's driving shaft 14 at the inner end of the vessel, and a casing 15 defining an annular U-section conduit 16 having a radial inlet passage 17 and a vaned radial outlet passage 9.

The ducting 6 is secured to the inner end of the tube 10 and includes an inlet opening for receiving gas discharged from the blower's discharge passage 9. Sealing rings 20 on the ducting engage a rim 21 defining the entry to the plenum chamber. The inlet passage 17 has therein a peripheral series of pivotal vanes 22 angularly adjustable to vary the gas flow through the circulator. The vane-adjusting means are as described in co-pending patent application No. 766,057.

The inner end of the tube 10 includes a carrier ring 23 secured within the tube end by (a) a peripheral series of segments 24 penetrating an annular slot 25 in the ring 23 and projecting into an annular socket 26 in the tube 10 and (b) a clamping ring 27 bolted to the ring 23 and abutting a shoulder 28 in the bore of the tube. A peripheral flange 29 on the motor 11 abuts the clamping ring 27, and the motor is releasably secured to the carrier ring 23 by a peripheral series of axial tie rods 30 having screw-threaded inner ends engaging in tapped sockets 31 in the ring 23 and having screw-threaded outer ends carrying nuts 32 engaging distance sleeves 33 abutting a flange 34 on the motor.

The opening defined by the carrier ring 23 is closed by the motor's inner end which includes a cylindrical periphery 35 slidingly engaging the cyclindrical bore of the ring 23 and embodying a piston ring 36, and a shielding end wall 37. The outer end plate 38 of the blower casing 15 is secured to the inner end of the motor so that the entire blower is mounted on the inner end of the motor and withdrawing movement of the detached motor effects opening of the tube's inner end and movement of the blower into the tube.

A gas-tight isolator for the inner end of the housing 10 consists of a seat formed by the face 23A of the ring 23; a ring 42 spaced axially inwards from the seat 23A to form therewith an annular through passage surrounding the blower and aligned with the blower's inlet passage 17 to permit flow of gas into the blower; and an end cover 39 in the bore of the duct 6 and composed of a dome 40 and a skirt 41, said end cover being spaced axially inwards from the ring 42 to form therewith an annular through passage surrounding the blower and aligned with the blower's discharge passage 9 and with the duct's inlet opening so that there is flow of gas through the blower and into the duct. The ring 42 and end cover 39 are slidingly mounted in the bore of the duct 6 for axial reciprocation towards and from the seat 23A. Thus, the ring and end cover slidingly engage surfaces in the bore of a ring 44 of the duct, and the peripheral surface of a ring 46 embodied in the centre wall 43 of the blower. The ring 42 carries a sealing ring 45 on its outer periphery.

The movement of the end cover 39 and ring 42 is effected by (a) a cover 39 composed of a dome 40 and a skirt 41 and disposed in the centre space defined by the ducting annulus 6; (b) a bridging ring 42 closing the annular gap between the periphery of the centre-wall 43 of the blower casing and the corresponding centre ring 44 of the ducting 6, a seal being maintained by sealing rings 45 and 46 on the ring 42 and wall 43 respectively; (c) a peripheral series of reciprocable axial draw rods 47 connected at their inner ends to the cover 39 and slidingly extending through openings in, successively, the bridging ring 42, the carrier ring 23, the clamping ring 27, and end flanges 29 and 34 on the motor; and (d) actuating means 48 connected to the outer ends of the draw rods and operable to reciprocate the rods and thereby move the cover and the bridging ring between sealing and open positions.

The skirt 41 of the cover 39 serves as a bridging ring substantially closing the annular gap between the end wall 49 of the blower casing and the corresponding end wall 50 of the ducting 6. A disc 51 closes the centre of the ducting annulus 6 to form a compartment 52 for the cover 39, and an annular stop 53 on the disc is engaged by an annular flange 54 on the rear of the cover. The compartment 52 is in communication with a low-pressure zone in the blower 8 so that the relatively high pressure within the cover tends to maintain the cover open—and so stabilizes the cover. The draw rods 47 are screwed into the skirt 41 and have thereon shoulders 55 which engage the ring 42 to return same from its tube-engaging position to its bridging position. Co-operating shoulders 56 on the rings 42 and 44 limit the inward movement of the ring 42 during opening of the cover.

The actuating means 48 consist of a box-section annulus 57 having three peripherally spaced nut formations 58 penetrated by three screw threaded axial rods 59 rotatably mounted on the motor at the rear end thereof; a drive to the rear ends of the rods consisting of an axial drive shaft 60 penetrating the front closure 12, a gear box 61 distributing the drive to three radial shafts 62, and worms 63 on the shafts 62 engaging worm wheels 64 on the rear ends of the rods 59; and arms 65 extending from the annulus and to which the rear ends of the draw rods 47 are detachably secured. The draw rods 47 are retained in their fully withdrawn position by three anchorages 66 located within the tube 10 at the periphery thereof. Each anchorage includes an arm 67 on a hinge sleeve 68 carrying a half-sleeve 69 which engages a neck 70 on the rod 47 and abuts the shoulder formed by the neck to retain the rod in its fully withdrawn position, the hinge sleeve being screw-adjustable axially to ensure that the half-sleeve tightly abuts the shoulder.

To isolate the closed tube 10 from the gas space 4, the actuating means 48 are operated so that the cover 39 is drawn outwards by the rods 47, and engages the end face 42A of the bridging ring 42 and carries said ring outwards and clamps same against the end face 23A of the carrier ring 23 so that the cover and bridging ring together seal the tube end in a gas-tight manner. Also, the skirt 41 of the cover 39 seals the inlet opening of the ducting 6. Thus, the tube 10 is completely isolated from the gas space, and gas flow is prevented (FIG. 5). The cover is maintained in isolating position by the combined action of the actuating means 48 and the gas pressure in the gas space. The tube on being thus isolated from the gas space may be depressurized, and the unit formed by the motor and the blower, following transfer of the draw rods from the motor to the anchorages 66, may then be withdrawn from the tube, through the previously opened outer end thereof, for servicing or repair while the power station continues to operate with the remaining circulators. On returning the serviced unit to the tube and sealing the outer end of the tube, the actuating means are operated to restore the cover and bridging ring to their open position. Moreover, when the nuclear reactor is closed down, the bridging ring and cover may be withdrawn following detachment of the carrier ring from the tube end.

Figure 6:
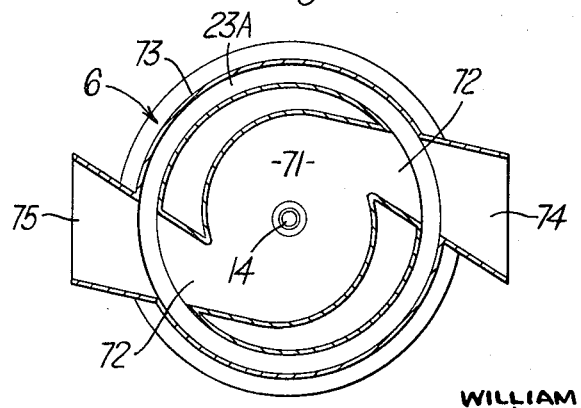
FIG. 6 is a cross-sectional view in the axially outward direction showing a modified form of blower and ducting.

In a modification (FIG. 6) the blower casing has adjacent to the inner end of the tube a double-volute outlet passage 71 with two diametrically opposed discharge portions 72. The ducting 6 spaced from the periphery of the blower casing includes an annulus 73 and a pair of opposed discharge portions 74 and 75 aligned with the discharge portions 72 of the blower casing. The inlet passage (not shown) of the blower casing is a radially directed annular passage with parallel side plates and houses a peripheral series of angularly adjustable vanes.

We claim:

1. A gas circulator for the circulation of cooling gas in the pressure vessel of a nuclear reactor plant comprising a tubular housing in an opening in the wall of the pressure vessel; a motor in the housing; a blower in the pressure vessel drivingly connected to the motor and presenting radially outwardly directed inlet and discharge openings; ducting in the pressure vessel communicating with the blower inlet and discharge openings; discharge opening to receive the gas flow from the blower; and an isolator for the housing comprising an annular seat at the inner end of the housing, a ring spaced axially inwards from the seat to form therewith an annular through passage surrounding the blower, and an end cover spaced axially inwards from the ring to form therewith an annular through passage surrounding the blower, the annular through passages permitting flow of gas through the blower and ducting and the ring being axially movable on to the seat and the end cover being axially movable on to the ring so that the ring and end cover together form an end cap enclosing the blower and closing the inner end of the housing.

2. A gas circulator according to claim 1, wherein the end cover is axially movable to engage the isolator ring and move same on to the seat.

3. A gas circulator according to claim 1, wherein the end cover and isolator ring slidingly engage bearing surfaces presented by the ducting and the blower periphery.

4. A gas circulator according to claim 1, wherein a compartment encloses the end cover and is connected to a low-pressure zone in the blower so that the high-pressure gas maintains the end cover stabilized in open position.

5. A gas circulator according to claim 1, wherein the seat is presented by a seating ring within the inner end portion of the housing, a plurality of peripherally spaced axial draw rods extend slidingly through openings in the isolator ring and the seating ring and are connected at their inner ends to the end cover, shoulders on the draw rods are engageable with the isolator ring to move same from its outer position to its inner position, abutments on the end cover and duct are co-operable to limit the inward move of the end cover and thereby locate the end cover and isolator ring in their inner positions, and actuating means are connected to the outer ends of the rods and extend through the closed outer end of the housing so as to be operable from outwith the housing to effect reciprocation of the rods.

6. A gas circulator according to claim 5, wherein the actuating means include an annulus to which are detachably connected the outer ends of the draw rods and which has thereon nut formations penetrated by screw-threaded rods rotatably mounted on the motor, and stops are hingedly mounted in the housing for movement into engagement with the outer ends of the rods to anchor same in withdrawn position prior to detachment of the rod ends from the annulus and withdrawal of the motor and the blower through the housing's outer end.

7. A gas circulator according to claim 5, wherein a seating ring is detachable from the inner end portion of the housing to enable withdrawal of the isolator ring and end cover.

References Cited
UNITED STATES PATENTS

| | | | |
|---|---|---|---|
| 3,000,543 | 9/1961 | Paul | 222—333 |
| 3,072,069 | 1/1963 | Wittwer | 103—218 |

ROBERT M. WALKER, Primary Examiner

UNITED STATES PATENT OFFICE
CERTIFICATE OF CORRECTION

Patent No. 3,671,149                Dated June 20, 1972

Inventor(s) William Milton Fraser, Walter John Cairns, and Ian Norman MacDonald

It is certified that error appears in the above-identified patent and that said Letters Patent are hereby corrected as shown below:

Column 1, the second and third lines in the listing of the inventors the name "McDonald" should read --MacDonald--.

Signed and sealed this 3rd day of October 1972.

(SEAL)
Attest:

EDWARD M. FLETCHER, JR.　　　　　　　　ROBERT GOTTSCHALK
Attesting Officer　　　　　　　　　　　　Commissioner of Patents